(12) United States Patent
Cluff et al.

(10) Patent No.: US 6,480,576 B1
(45) Date of Patent: Nov. 12, 2002

(54) METHOD AND DEVICE FOR DETECTING PATH FAULTS IN A NETWORK

(75) Inventors: Michael S. Cluff, Eatontown, NJ (US); John D. Francis, Brooklyn, NY (US); Allen J. Mollica, Middlesex, NJ (US)

(73) Assignee: AT&T Corp., New York, NY (US)

( * ) Notice: Subject to any disclaimer, the term of this patent is extended or adjusted under 35 U.S.C. 154(b) by 67 days.

(21) Appl. No.: 09/588,406

(22) Filed: Jun. 6, 2000

(51) Int. Cl.⁷ .................................................. H04M 1/24
(52) U.S. Cl. ................. 379/29.01; 379/1.01; 379/22.01; 379/22.02; 379/32.01; 379/32.02; 379/2
(58) Field of Search ................. 379/1.01, 29.01, 379/32.01, 32.04, 1.03, 1.04, 2, 10.01, 10.02, 12, 19, 22, 22.01, 22.02, 22.03, 24, 26.01, 27.01, 27.03, 27.04, 29.05, 30

(56) References Cited

U.S. PATENT DOCUMENTS

| | | | | |
|---|---|---|---|---|
| 4,736,402 A | * | 4/1988 | Landis | 379/16 |
| 5,018,184 A | * | 5/1991 | Abrams et al. | 379/29 |
| 5,073,919 A | * | 12/1991 | Hagensick | 379/29 |
| 5,353,327 A | * | 10/1994 | Adari et al. | 379/22 |
| 5,463,670 A | * | 10/1995 | Chiang et al. | 379/27 |
| 5,875,230 A | * | 2/1999 | Ganley et al. | 379/29 |

* cited by examiner

*Primary Examiner*—Rexford Barnie

(57) ABSTRACT

For testing a network, a connection between an originating station and an answering station is established over the network. Signals are sent over the connection and if the signals are not correctly received through the connection, the connection is maintained and a message is sent to a monitoring station indicating that a defective connection has been detected.

22 Claims, 4 Drawing Sheets

METHOD AND DEVICE FOR DETECTING PATH FAULTS IN A NETWORK

BACKGROUND OF THE INVENTION

1. Field of Invention

This invention relates to communication systems and methods. More particularly, this invention relates to method and devices for detecting path faults in a telephone network.

2. Description of Related Art

In the past, to test a telephone network, technicians used test systems that were connected to the telephone network. The technicians established a telephone communication link between two of those test systems and controlled them to send test signals over the telephone network. The reception quality of the signals was then determined and path faults were detected based on the reception quality. However, such a testing process is very time-consuming and costly. Therefore, there is a need for automatic and semi-automatic detection of path faults in a network.

SUMMARY OF THE INVENTION

According to exemplary embodiments of the invention, for testing a network, a connection is established over the network and signals are sent over the connection. If the signals are not correctly received through the connection, the connection is maintained and a message is sent to a monitoring station indicating that a defective connection has been detected.

These and other features and advantages of this invention are described in or are apparent from the following detailed description of the path fault detection system and method according to exemplary embodiments of this invention.

BRIEF DESCRIPTION OF THE DRAWINGS

The benefits of the present invention will be readily appreciated and understood from consideration of the following detailed description of exemplary embodiments of this invention, when taken together with the accompanying drawings in which.

DETAILED DESCRIPTION OF PREFERRED EMBODIMENTS

Figure 1:
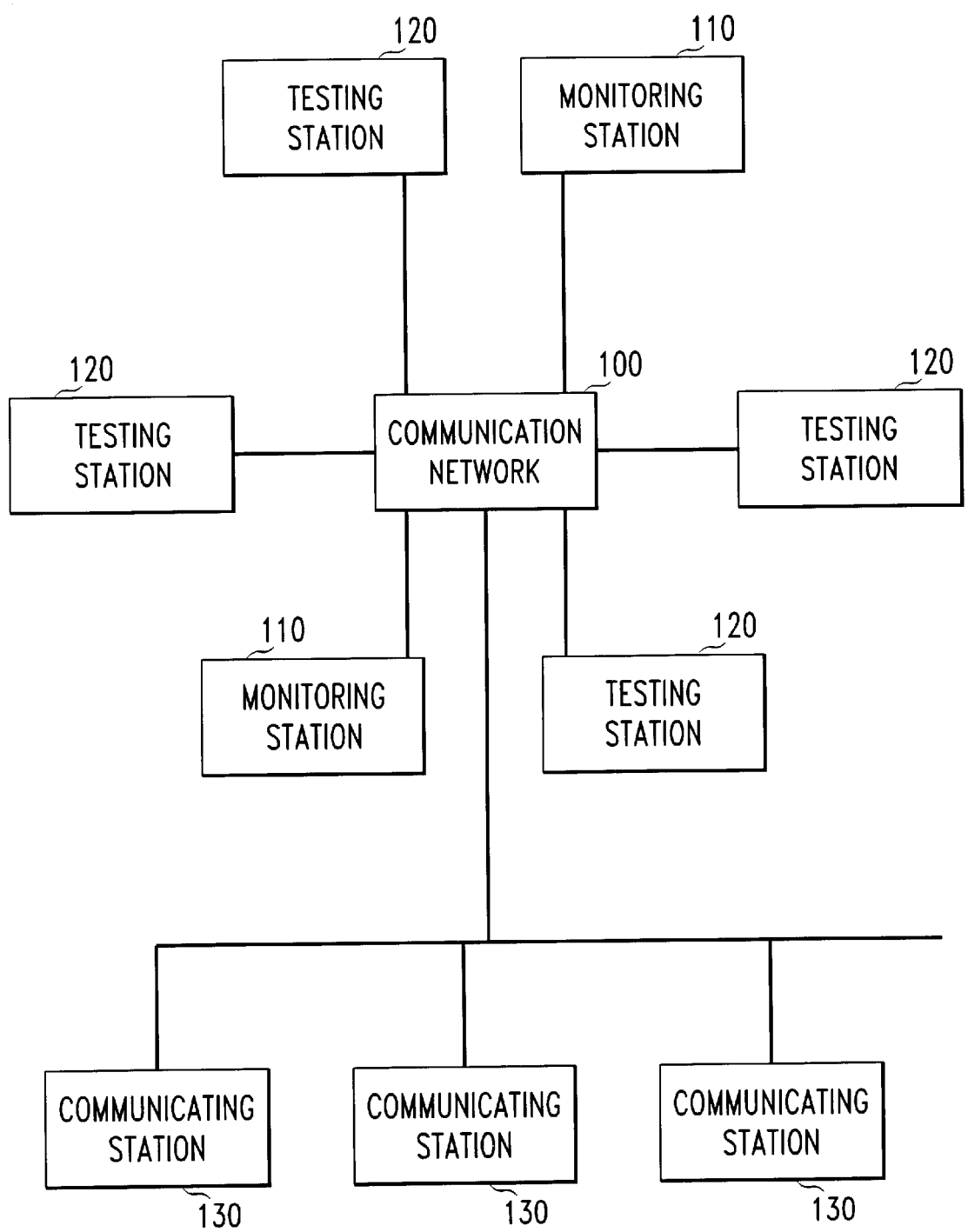
FIG. 1 is a schematic representation of a communication network, testing stations and monitoring stations according to the exemplary embodiments of the invention.

FIG. 1 illustrates a communication network 100 that is coupled to two monitoring stations 110, four testing stations 120 and a plurality of communication systems 130. The communication systems 130 are able to provide signals to the communication network 100 and/or to receive signals from the communication network 100. One or more of the communication systems 130 may include a modem, a facsimile machine, a facsimile circuit board, a telephone, an Internet Protocol (IP) communicating device, a computer and/or a scanner.

The communication network 100 allows the communication systems 130 to communicate with one another. The communication network 100 may support one or more types and quantities of telephony interfaces, such as analog 2-wire, analog 4-wire, TI, ISDN, etc. The communication network 100 may include links of one or more of wireless links, wire links, cables, optical fibers, radio links, IP links, etc.

The monitoring stations 110 are used to monitor and control the testing stations 120 either locally or remotely. The monitoring stations 110 are able to receive signals from the testing stations 120 and to display information corresponding to the received signals to a user. The monitoring stations 110 are also able to send signals to the testing stations 120. It should be appreciated that only one monitoring station 110 may be sufficient to monitor a large number of testing stations 120.

Each of the testing stations 120 may support one or more types and quantities of telephony interfaces, such as analog 2-wire, analog 4-wire, TI, ISDN, etc. In the exemplary embodiment shown in FIG. 1, the testing stations 120 are each able to originate and answer a telephone call, including going on-hook, going off-hook, dialing, detecting supervisory signaling, etc. However, in other exemplary embodiments, one or more of the testing stations may be able to only originate a telephone call or only answer a telephone call.

In the exemplary embodiment shown in FIG. 1, each one of the testing stations 120 is able to call another testing station 120, to send test signals to the called testing station 120, to receive test signals from the called testing station 120, to determine whether the calling testing station 120 correctly receives the test signals from the called testing station 120, and when it is a called testing station 120, to determine whether the called testing station 120 correctly receives the test signals from the calling testing station 120.

When the testing station 120 determines that it has not correctly received testing signals that have been sent to it, the testing station 120 is able to send a signal indicating the incorrect reception to one or more of the monitoring stations 110.

It should be appreciated that a minimum of two testing stations is needed to set up any one connection. The maximum number of testing stations available for connection, N, is equal to the total number of possible originating and terminating points of the network under investigation. With these testing stations in place, the total number of connections that can be tested is equal to N factorial or N!. Moreover, the number of connections that can be simultaneously tested is N/2 if N is an even number or (N−1)/2 if N is an odd number.

In operation, one of the testing stations 120 places a call to another testing station 120. The calling testing station 120 is also referred to as "the originating station" and the called testing station 120 is also referred to as "the answering station". If the call attempt fails, for example due to network blocking, station busy, etc., the originating station 120 re-attempts the call to the answering station 120. Otherwise, the answering station 120 answers the call.

If a large number of call attempts fail, the originating station sends a message to the monitoring station 110 to inform the monitoring station of the successive failed attempts. In that case, the connection is said to be "inoperative".

After a connection is established between the originating station 120 and the answering station 120, a transmission test is performed by both the testing stations involved in the communication. The originating station 120 transmits a series of common databand signals, e.g., voiceband signals such as network response tones, voice, dual tone modulation frequencies, any combination of signals having frequencies in the range of frequencies that may be used in the network, etc., to the answering station 120. If the answering station 120 correctly identifies all the transmitted signals, then the transmission path from the originating station 120 to the answering station 120 is of good quality. Otherwise, the transmission path from the originating station 120 to the answering station 120 is defective and the answering station 120 transmits a signal to one or more of the monitoring station 110 to inform the monitoring station(s) 110 that a defective path has been detected. If the transmission path from the originating station 120 to the answering station 120 is of good quality, the answering station 120 transmits a series of common databand signals, e.g., voiceband signals such as network response tones, voice, dual tone modulation frequencies, any combination of signals having frequencies in the range of frequencies that may be used in the network, etc., to the originating station 120.

If the originating station 120 correctly identifies all the transmitted signals, then the transmission path from the answering station 120 to the originating station 120 is of good quality. Otherwise the transmission path from the answering station 120 to the originating station 120 is defective and the originating station 120 transmits a signal to one or more of the monitoring stations 110 to inform the monitoring station(s) 110 that a defective path has been detected. If the transmission paths in both directions are of good quality, the tests have been passed, the connection is dropped and the testing stations involved in the test may repeat the same test either with the same testing station or with any other testing station 120. If one defective transmission path has been detected, the connection is maintained and one or more of the testing stations 120 involved in the test transmits a unique series of identification signals over the defective transmission path to allow a tester to find the transmission path in the network, traces the call and monitors the condition of the transmission path during the root cause investigation. Complementarily, the defective transmission path may be tested again as explained above.

One or more of the testing stations 120 may drop the connection between the originating station 120 and the answering station 120 upon reception of a disconnection request message from one of the monitoring stations 110, or after a predetermined amount of time.

Figure 2:
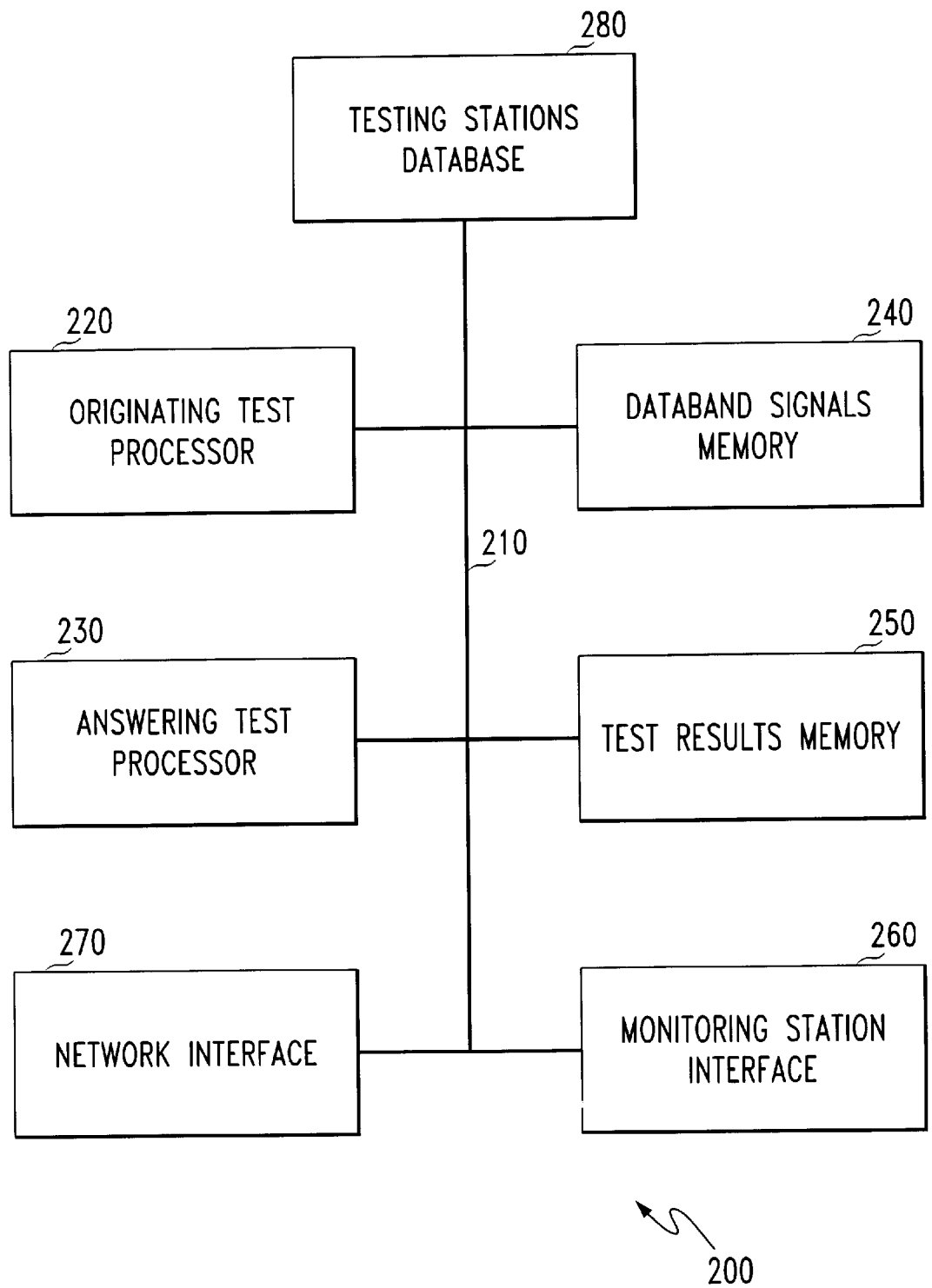
FIG. 2 is a functional block diagram of a testing station according to an exemplary embodiment of the invention.

The testing station 200 shown in FIG. 2 comprises, coupled together by a control and data bus 210, an originating test processor 220, an answering test processor 230, a databand signals memory 240, a test results memory 250, a monitoring station interface 260, a network interface 270 and a testing stations database 280.

The control and data bus 210 allows the originating test processor 220 and the answering test processor 230 to control the other components of the testing station 200 and to receive and send data to the other components of the testing station 200.

The originating test processor 220 is able to initiate and control the test of a transmission path between the testing station 200 and another testing station. The answering test processor 230 is able to cooperate with an originating test processor of another testing station to test the transmission path between the testing station 200 and the other testing station.

The databand signals memory 240 is able to store and to provide databand test signals, such as voiceband signals, dual tone modulation frequencies, voice samples, musical sounds, any combination of signals having frequencies in the range of frequencies that may be used in the network, etc. The test results memory 250 is able to store and to provide test results provided by one of the processors 220 and 230. The monitoring station interface 260 is able to organize a communication with a monitoring station across a communication network through the network interface 270. The network interface 270 is able to organize the communication across the network using the transmission paths that are to be tested by the testing station 200. More specifically, the network interface 270 is able to carry out the protocol used to communicate across the network.

The testing station database 280 stores the addresses of the other testing stations in the network. The testing station database 280 also stores an indication of the testing stations that are currently performing a test.

In operation, the originating test processor 220 determines when the testing station 200 is to originate a new test. The originating test processor 220 then determines if the network interface 270 is available for performing a new test. If a number M of tests are currently performed and if the network interface 270 is only able to simultaneously handle M+1 connections, then the network interface 270 is not available for performing a new test, because, in the exemplary embodiment outlined in FIG. 2, one connection always remains available for calling a monitoring station. Otherwise, the network interface 270 is available for performing a new test. In other exemplary embodiments, as long as one connection is available, the originating test processor 220 determines that the network interface is available for performing a new test. In that case, if it is later necessary to communicate with a monitoring station, the originating test processor 220 waits for a connection to become available before the originating test processor calls the monitoring station.

Next, the originating test processor 220 selects, in the testing station database 280, the address of a testing station, called the answering station, with which no test is currently performed. The originating test processor 220 then places a call to the selected answering station. The originating test processor 220 determines if the call attempt has failed. If so, information that the call attempt has failed is stored in the test results memory 250 with an identification of the answering station, such as, for example, the address of the answering station in the network.

The originating test processor 220 then determines if the number of failed attempts during a certain period of time, for example, one hour, is higher than a predetermined number. If so, the connection with the answering station is considered inoperative and the originating test processor 220 controls the monitoring station interface 260 and the network interface 270 to place a call to a monitoring station to inform the monitoring station of the inoperative connection. Otherwise, the originating test processor 220 re-attempts the call to the answering station.

If the connection between the testing station 200 and the answering station is established, a transmission test is performed under the control of the originating test processor 220 of the testing station 200 and the answering test processor of the answering test station. In the test, the originating test processor 220 controls the databand signals memory 240 and the network interface 270 to transmit a series of common databand signals, e.g., voiceband signals such as network response tones, voice, dual tone modulation frequencies, any combination of signals having frequencies in the range of frequencies that may be used in the network, etc., to the answering station across the network. The originating test processor 220 then waits for a predetermined series of common databand signals from the answering station. If the originating test processor 220 identifies the expected databand signals within a certain period of time after the connection is established, then the transmission path from the answering station to the testing station 200 is of good quality.

Otherwise, the transmission path from the answering station to the testing station 200 is defective and the originating test processor 220 controls the monitoring station interface 260 and the network interface 270 to transmit a signal to one or more of the monitoring stations to inform the monitoring station(s) that a defective path has been detected. If the transmission path from the answering station to the testing station 200 is defective, the connection with the answering station is kept up and the testing station 200 receives a unique series of identification signals over the defective transmission path and process these identification signals to identify the defective transmission path in the network and forward the identity of the defective transmission path to the monitoring station. Alternatively, the testing station forwards the unique series of identification signals to the monitoring station to allow a determination of the defective transmission path in the network by the monitoring station.

The originating test processor 220 drops the connection between the testing station 200 and the answering station either after a specific period of time, or upon reception of a disconnection request message from a monitoring station. If, before the connection is dropped, the testing station 200 receives a unique series of identification signals from a monitoring station, then the originating test processor 220 of the testing station controls the network interface 270 to forward this unique series of identification signals to the answering station. If the transmission path from the answering station to the testing station 200 is of good quality, the tests have been passed and the connection is dropped and the originating test processor 220 may repeat the same test either with the same answering station or with any other answering station.

In operation, when a call is received from an originating station, the answering test processor 230 controls the network interface 270 to answer the call. After the connection is established between the originating station and the testing station 200, a transmission test is performed under the control of the originating test processor of the originating station and the answering test processor 230 of the testing station 200. During the test, the answering test processor 230 waits for a predetermined series of common databand signals from the originating station. If the answering test processor 230 identifies the expected databand signals within a predetermined period of time after the connection has been established, then the transmission path from the originating station to the testing station 200 is of good quality. Otherwise, the transmission path from the originating station to the testing station 200 is defective and the answering test processor 230 controls the monitoring station interface 260 and the network interface 270 to transmit a signal to one or more of the monitoring stations in order to inform the monitoring station(s) that a defective path has been detected.

If the transmission path from the originating station to the testing station 200 is defective, the connection with the originating station is kept up and the testing station 200 receives a unique series of identification signals over the defective transmission path and processes these identification signals to identify the defective transmission path in the network and forward the identity of the defective transmission path to the monitoring station. Alternatively, the testing station forwards the unique series of identification signals to the monitoring station to allow a determination of the defective transmission path in the network by the monitoring station.

The answering test processor 230 drops the connection between the testing station 200 and the originating station either after a specific period of time or upon reception of a disconnection request message from a monitoring station. If the transmission path between the originating station and the testing station 200 is of good quality, the answering test processor 230 controls the databand signals memory 240 and the network interface 270 to transmit a series of common databand signals (e.g., voiceband signals, network response tones, voice, dual tone modulation frequencies, any combination of signals having frequencies in the range of frequencies that may be used in the network, etc.) to the originating station across the network. If, before the connection is dropped, the testing station 200 receives a unique series of identification signals from a monitoring station, the answering test processor 230 controls the network interface 270 to forward this unique series of identification signals to the answering station. After the connection is dropped, the answering test processor 230 may repeat the same test either with the same originating station or with any other originating station.

Figure 3:
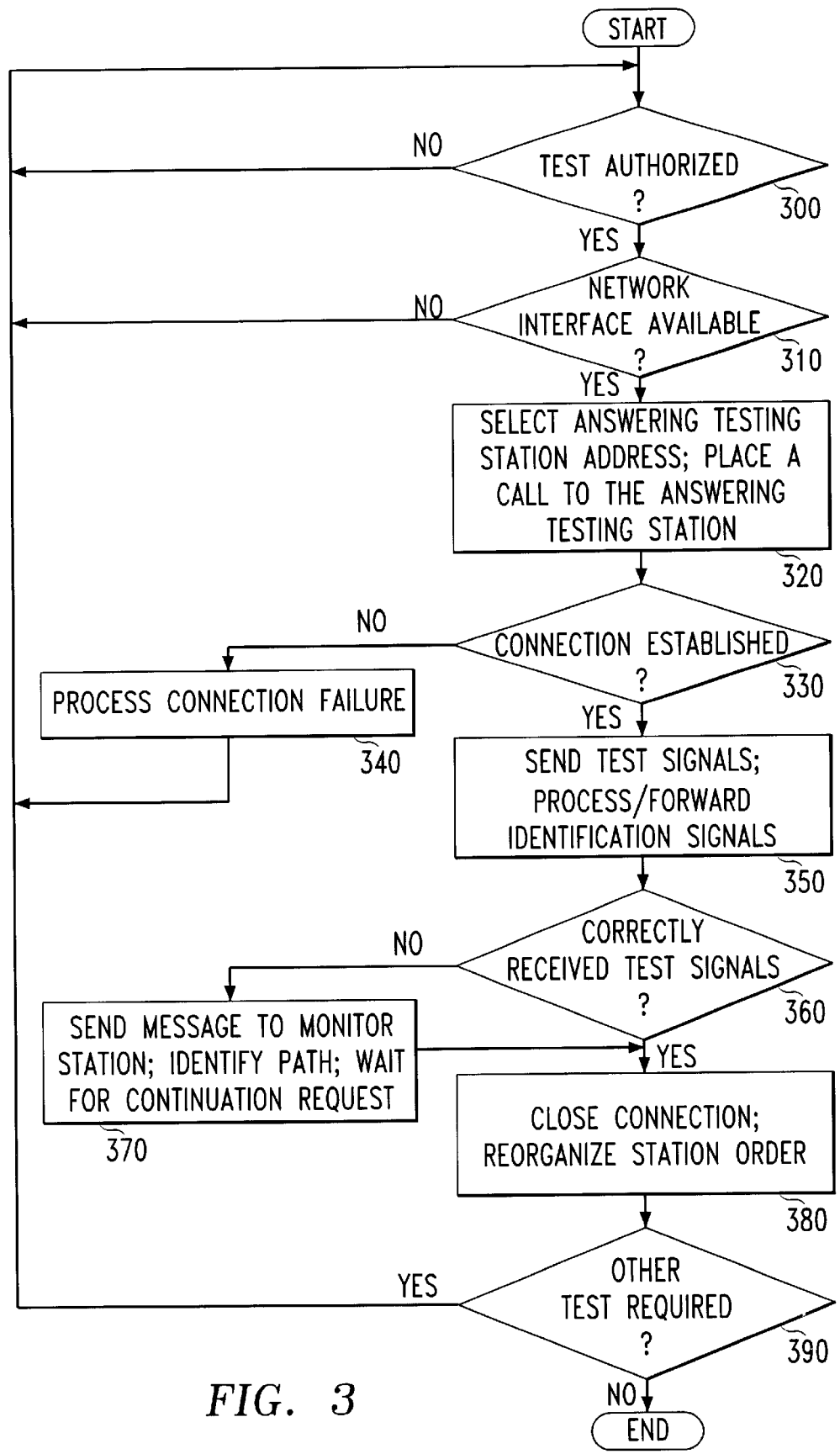
FIG. 3 is a flowchart implementing an originating testing method according to an exemplary embodiment of this invention.

FIG. 3 is a flowchart illustrating an originating testing method according to a second exemplary embodiment of this invention. Beginning in step 300, a determination is made whether a test is authorized. For example, a determination is made whether the hour is within a range corresponding to a low traffic charge on the network or whether the hour corresponds to a working hour for maintenance technicians that operate monitoring stations. If the test is authorized, control continues to step 310. Otherwise, control returns to step 300. In step 310, a determination is made whether a network interface is available. For example, a determination is made if M number of tests are currently being performed. If the network interface is only able to simultaneously handle M+1 connections, then the network interface is not available for performing a new test. If so, control continues to step 320. Otherwise, control returns to step 300. In step 320, a selection is made of an answering station with which no test is currently performed and a call is placed to the selected answering station.

In step 330, a determination is made whether a connection with the answering station has been established. If so, control jumps to step 350. Otherwise, control continues to step 340. In step 340, the connection failure is processed. For example, a determination is made if the number of failed attempts during a certain period of time, for example, one hour, is higher than a predetermined number. If so, in step 340, the connection with the answering station is considered to be inoperative and a call is placed to a monitoring station to inform the monitoring station of the inoperative connection. Next, control returns to step 300.

In step 350, a transmission to the answering station is made across the network. During the transmission, test signals including a series of common databand signals (e.g., voiceband signals, network response tones, voice, dual tone modulation frequencies, any combination of signals having frequencies in the range of frequencies that may be used in the network, etc.) are transmitted to the answering station across the network. If a unique series of identification signals are received from a monitoring station, they are forwarded over the transmission path to the answering station during step 350, to allow a determination of the defective transmission path in the network. Next, in step 360, a determination is made if a series of expected databand signals have been correctly received within a certain period of time after the end of step 350. If so, control jumps to step 380. Otherwise, control continues to step 370. In step 370, a transmission to one or more of the monitoring stations is made in order to inform the monitoring station(s) that a defective path has been detected.

In step 370, the connection with the answering station is maintained, a unique series of identification signals is received over the defective transmission path and processed, or forwarded to the monitoring station, to allow a determination of the defective transmission path in the network. In step 370, as soon as a continuation request is received from a monitoring station, control continues to step 380. Otherwise, after a certain period of time, control continues to step 380.

In step 380, the connection with the answering station is closed and the station address order is reorganized so that the next selected station selected in the next occurrence of step 320 is not the same as the previously selected station.

Next, in step 390, a determination is made whether another test is requested. If so, control jumps back to step 300 and a test may be performed with another answering station. Otherwise, the process ends.

Figure 4:
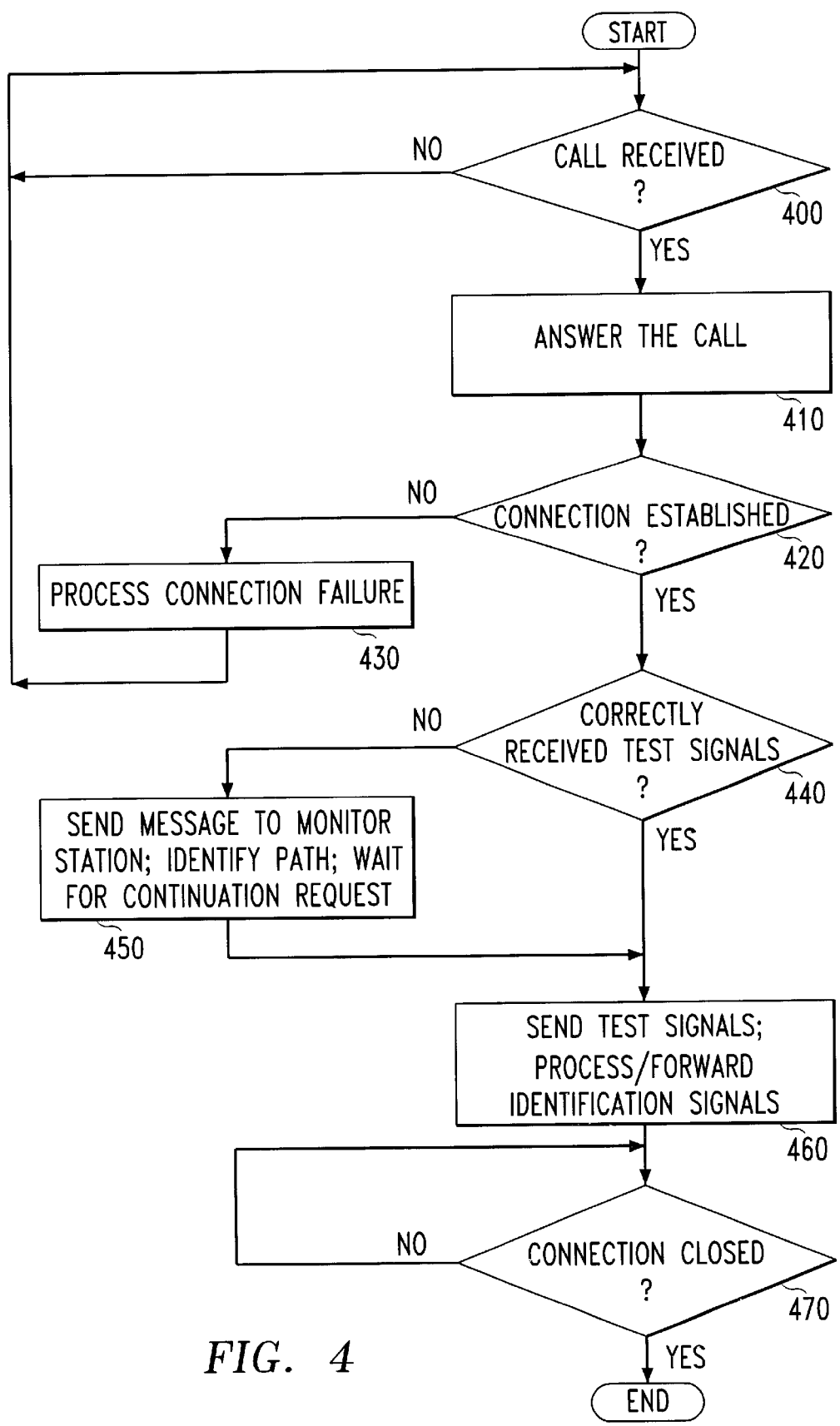
FIG. 4 is a flowchart implementing an answering testing method according to an exemplary embodiment of this invention.

FIG. 4 is a flowchart illustrating an answering testing method according to a third exemplary embodiment of this invention.

Beginning in step 400, a determination is made whether a call has been received. If so, control continues to step 410. Otherwise, control returns to step 400. In step 410, the call is answered and the establishment of a connection with the calling party is attempted. Next, in step 420, a determination is made whether a connection has been established with an originating station. If so, control jumps to step 440. Otherwise, control continues to step 430. In step 430, the connection failure is processed. For example, a determination is made if the number of failed attempts during a certain period of time, for example, one hour, is higher than a predetermined number. If so, in step 430, the connection with the originating station is considered as inoperative and a call is placed to a monitoring station in order to inform the monitoring station of the inoperative connection. Next, control returns to step 400.

In step 440, a determination is made if a series of expected databand signals have been correctly received within a certain period of time after the end of step 420. If so, control jumps to step 460. Otherwise, control continues to step 450. In step 450, a transmission to one or more of the monitoring stations is made in order to inform the monitoring station(s) that a defective path has been detected.

In step 450, the connection with the originating station is maintained and a unique series of identification signals is received at the answering station from the originating station, over the defective transmission path. The unique series of identification signals is processed to identify the defective transmission path in the network and forward the identity of the defective transmission path to the monitoring station. Alternatively, in step 450, the unique series of identification signals is forwarded to the monitoring station to allow a determination of the defective transmission path in the network by the monitoring station.

In step 450, as soon as a continuation request is received from a monitoring station, control continues to step 460. Otherwise, after a certain period of time, control continues to step 460.

In step 460, a transmission to the originating station is made across the network. During the transmission, test signals including a series of common databand signals (e.g., voiceband signals, network response tones, voice, dual tone modulation frequencies, any combination of signals having frequencies in the range of frequencies that may be used in the network, etc.) are transmitted to the originating station across the network. If a unique series of identification signals is received from a monitoring station, they are forwarded to the originating station over the tested transmission path during step 460, to allow a determination of the defective transmission path in the network.

In step 470, a determination is made whether the originating station has closed the connection. If so, the process ends. Otherwise, control returns to step 470.

The testing stations may be, in the exemplary embodiment of the invention shown in FIGS. 1 and 2, a microprocessor that uses software to implement exemplary embodiments of the methods and devices according to this invention. However, the testing stations can also be implemented on a special purpose computer, a programmed microcontroller and peripheral integrated circuit elements, an ASIC or other integrated circuit, a digital signal processor, a hardwire electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3 and 4 can be used to implement the testing stations.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention. service.

What is claimed is:

1. A method of testing a network, comprising:
   establishing a connection between an originating station and an answering station over the network;
   sending at least one signal over the connection;
   determining whether the at least one signal has been correctly received through the connection;
   if the at least one signal has not been correctly received through the connection, maintaining the established connection; and
   sending a message to a monitoring station indicating that a defective connection has been detected.

2. The method of claim 1, further comprising identifying the connection if the at least one signal has not been correctly received through the connection.

3. The method of claim 2, further comprising sending an identification of the connection to the monitoring station.

4. The method of claim 1, wherein sending at least one signal comprises sending signals from the originating station to the answering station and sending signals from the answering station to the originating station.

5. The method of claim 1, further comprising maintaining the connection established until a de-connection request has been received and closing the connection when a de-connection request has been received.

6. The method of claim 1, further comprising maintaining the connection established during a predetermined period of time and then closing the connection.

7. The method of claim 1, wherein the at least one signal comprises voiceband signals.

8. The method of claim 1, wherein the at least one signal comprises dual tone modulation signals.

9. The method of claim 1, further comprising keeping a record of the connection for each time the at least one signal is not correctly received.

10. The method of claim 1, further comprising attempting to automatically establishing the connection and, if the connection establishing fails, keeping a record of the connection establishing which failed.

11. A testing device for testing a network, comprising:
   a network interface that establishes a connection between an originating station and an answering station over the network;
   a first test processor that sends at least one signal over the connection;
   a second test processor that determines whether the at least one signal has been correctly received through the connection;
   wherein, if the at least one signal has not been correctly received through the connection, the test processors maintain the established connection and the network interface sends a message to a monitoring station indicating that a defective connection has been detected.

12. The testing device of claim 11, wherein the processors identify the connection if the at least one signal has not been correctly received through the connection.

13. The testing device of claim 12, wherein the network interface sends an identification of the connection to the monitoring station.

14. The testing device of claim 11, wherein the first test processor sends signals from the originating station to the answering station and the second test processor sends signals from the answering station to the originating station.

15. The testing device of claim 11, wherein the test processors maintain the connection established until one of the test processors receives a de-connection request.

16. The testing device of claim 11, wherein the test processors maintain the connection established during a predetermined period of time and then close the connection.

17. The testing device of claim 11, wherein the at least one signal comprising voiceband signals.

18. The testing device of claim 11, wherein the at least one signal comprises dual tone modulation signals.

19. The testing device of claim 11, wherein the monitoring station keeps a record of the connection for each time the at least one signal is not correctly received.

20. The testing device of claim 11, wherein the network interface attempts to automatically establish the connection and, if the connection establishing fails, one of the test processor keeps a record of the connection establishing which failed.

21. The method of claim 1, wherein sending the message to the monitoring station further comprises establishing a separate connection to the monitoring station.

22. The testing device of claim 11, wherein the network interface establishes a separate connection to send the message to the monitoring station.

* * * * *

UNITED STATES PATENT AND TRADEMARK OFFICE
CERTIFICATE OF CORRECTION

PATENT NO.    : 6,480,576 B1
DATED         : November 12, 2002
INVENTOR(S)   : Michael S. Cluff et al.

It is certified that error appears in the above-identified patent and that said Letters Patent is hereby corrected as shown below:

<u>Column 9,</u>
Line 12, change "establishing" to -- establish --.

<u>Column 10,</u>
Line 15, change "comprising" to -- comprises --.
Line 24, change "processor" to -- processors --.

Signed and Sealed this

Fourth Day of March, 2003

JAMES E. ROGAN
*Director of the United States Patent and Trademark Office*